United States Patent [19]

Pou

[11] 4,372,696

[45] Feb. 8, 1983

[54] HIGH QUALITY PRINTER

[75] Inventor: Frederick M. Pou, Dayton, Ohio

[73] Assignee: Monarch Marking Systems, Inc., Dayton, Ohio

[21] Appl. No.: 151,577

[22] Filed: May 20, 1980

[51] Int. Cl.³ .............................................. B41J 3/12
[52] U.S. Cl. ................................. 400/124; 101/93.05
[58] Field of Search .............................. 400/121, 124; 101/93.04, 93.05

[56] References Cited

U.S. PATENT DOCUMENTS

| | | | |
|---|---|---|---|
| 3,991,868 | 11/1976 | Robinson et al. | 400/124 |
| 4,125,336 | 11/1978 | Chu | 400/124 |
| 4,159,882 | 7/1979 | Sanders et al. | 400/656 X |
| 4,189,246 | 2/1980 | Kane et al. | 400/144.2 |
| 4,204,777 | 5/1980 | Jen | 400/124 |
| 4,210,404 | 7/1980 | Hanger | 400/124 |

Primary Examiner—Paul T. Sewell

Attorney, Agent, or Firm—Mason, Kolehmainen, Rathburn & Wyss

[57] ABSTRACT

A high quality, variable font, matrix printer employs a precise carriage position control system that precisely determines the position of the carriage at discrete positions in combination with a variable time delay in the matrix element firing circuit to permit each printed matrix element to be positioned at one of the various carriage positions, or between discrete carriage positions, thereby permitting essentially continuous horizontal lines and high quality characters of various fonts and sizes to be printed. In such a system, the positions of the elements forming the particular characters to be printed are defined by stored information representative of carriage position and time delay. Essentially continuous vertical lines are generated by precisely controlling the paper feed to permit matrix element overlap, and characters larger than the printing matrix may be generated utilizing multiple printing passes with an appropriate paper advance.

45 Claims, 18 Drawing Figures

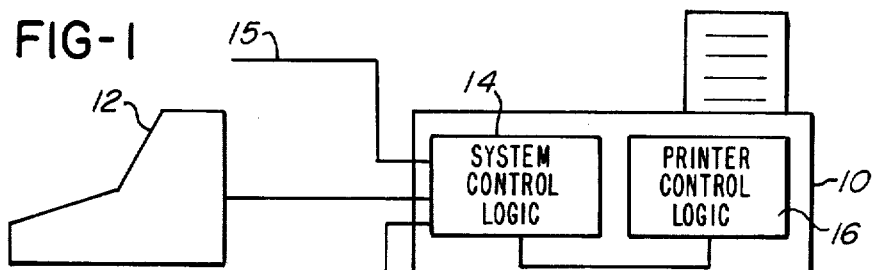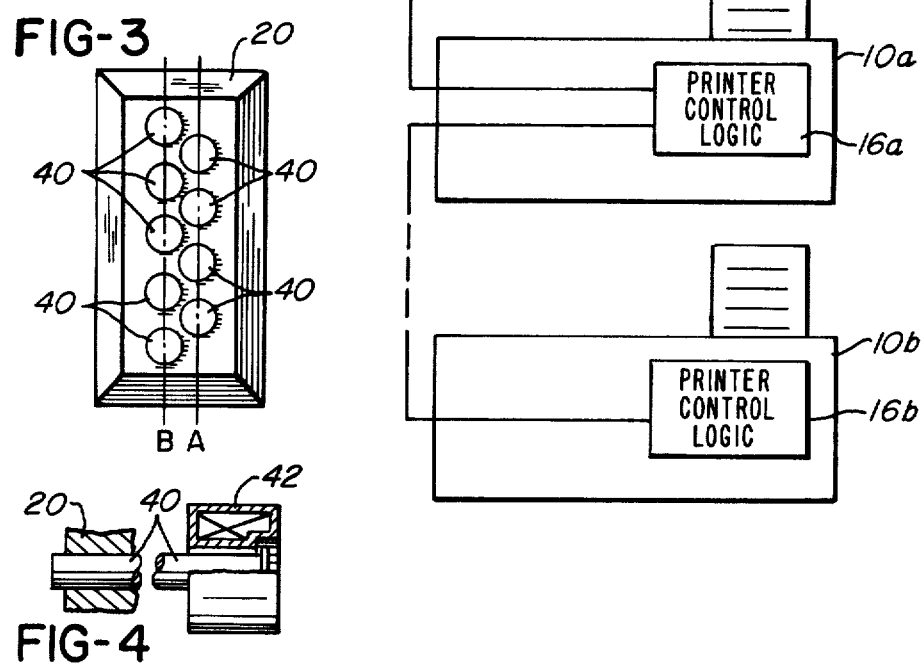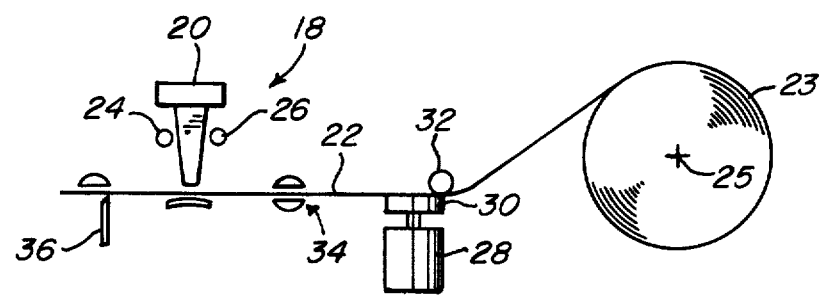

FIG-5
```
B4  + + + + + + + + + + + + + +
A3' + + + + + + + + + + + + + +
A3  + + + + + + + + + + + + + +
B3' + + + + + + + + + + + + + +
B3  + + + + + + + + + + + + + +
A2' + + + + + + + + + + + + + +
A2  + + + + + + + + + + + + + +
B2' + + + + + + + + + + + + + +
B2  + + + + + + + + + + + + + +
A1' + + + + + + + + + + + + + +
A1  + + + + + + + + + + + + + +
B1' + + + + + + + + + + + + + +
B1  + + + + + + + + + + + + + +
A0' + + + + + + + + + + + + + +
A0  + + + + + + + + + + + + + +
B0' + + + + + + + + + + + + + +
B0  + + + + + + + + + + + + + +
    0 1 2 3 4 5 6 7 8 9 10 11 12 13
```
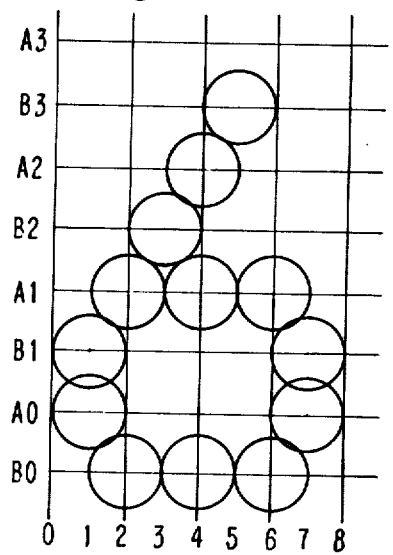
FIG-6
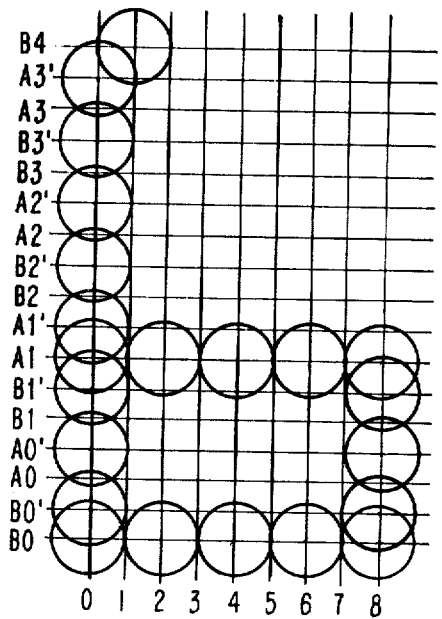
FIG-7

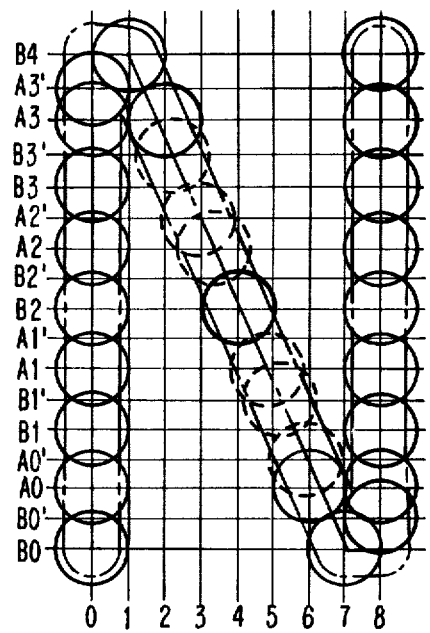
FIG-8
FIG-9
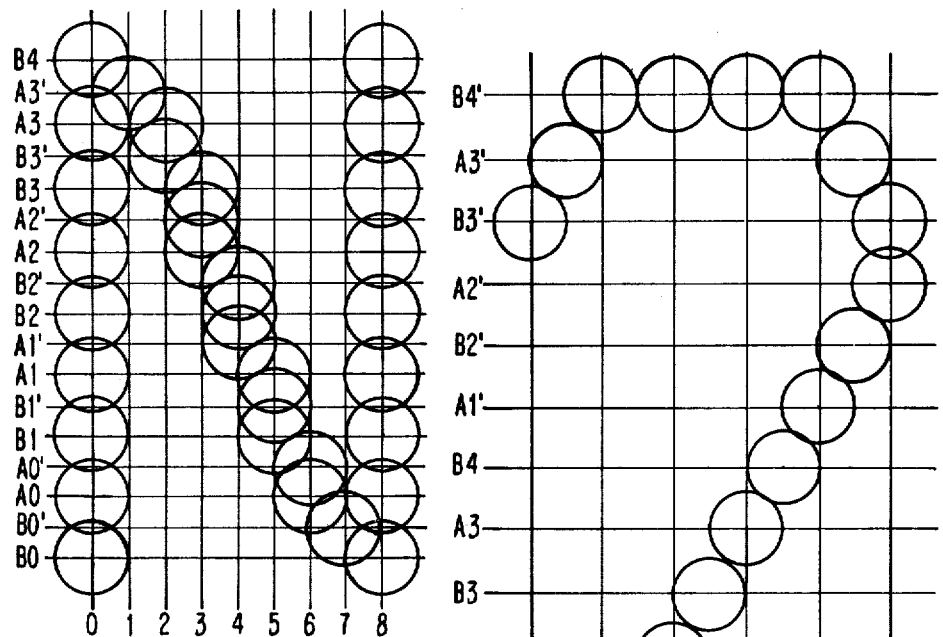
FIG-10

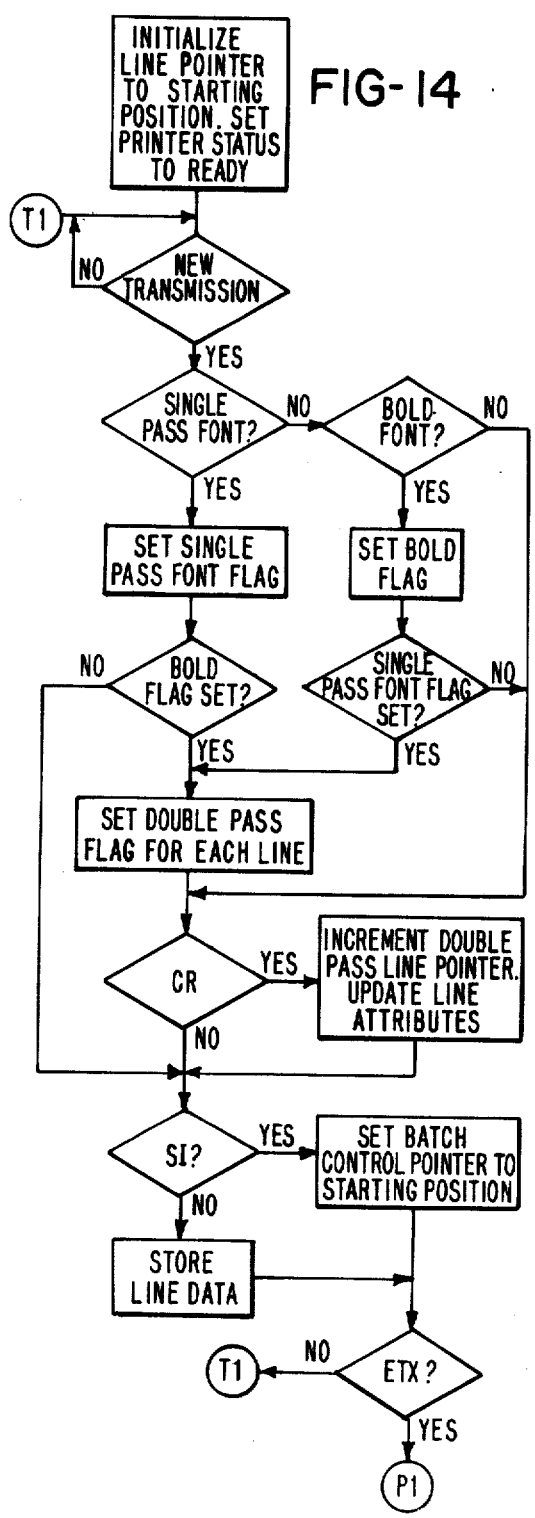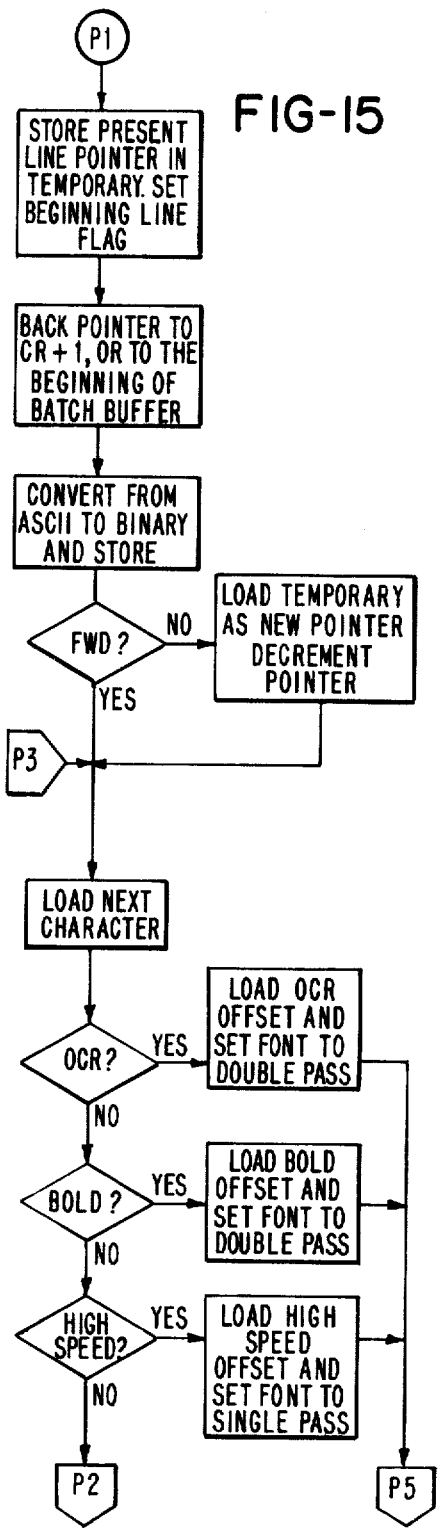

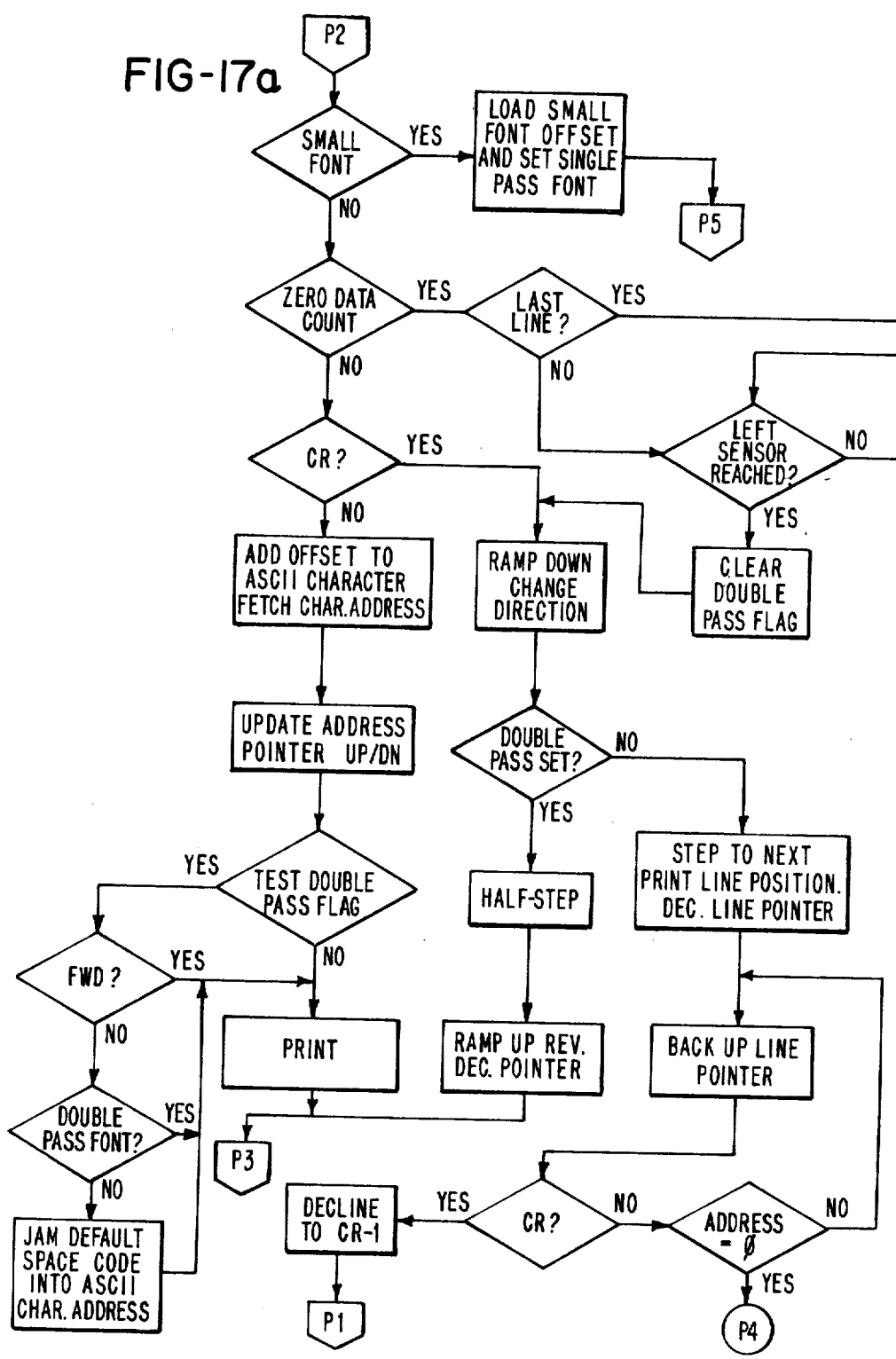

HIGH QUALITY PRINTER

BACKGROUND OF THE INVENTION

1. Field of the Invention

This invention relates generally to printers, and more particularly to a high quality printer that utilizes a plurality of matrix elements for producing high quality characters in various fonts.

2. Description of the Prior Art

Matrix printers are known, and typical matrix printers according to the prior art are disclosed in U.S. Pat. Nos. 4,159,882; 3,882,988; 3,942,620; and 3,900,094.

While the devices disclosed in the above patents provide a way to achieve matrix printing of reasonable quality, they do not provide the flexibility of positioning of the matrix elements provided by the apparatus according to the present invention.

SUMMARY OF THE INVENTION

Accordingly, it is an object of the present invention to provide an improved matrix printer that overcomes many of the disadvantages of the prior art matrix printers.

It is another object of the present invention to provide a matrix printer that provides great accuracy in the positioning of the printing elements to permit high quality characters of various fonts to be produced.

It is yet another object of the present invention to provide a matrix printer that provides greater flexibility in the positioning of the various elements forming the printed characters than has heretofore been achieved.

It is yet another object of the invention to provide a matrix printer capable of printing characters of various sizes.

It is yet another object of the present invention to provide a printer capable of printing a line of characters in a single pass.

It is still another object of the present invention to provide a matrix printer capable of printing a line of high quality characters in two passes in opposite directions.

It is still another object of the present invention to provide a matrix printer capable of intermixing characters of the type that can be printed in a single pass with characters of the type that require two passes on the same line.

It is yet another object of the present invention to provide a matrix printer capable of printing characters with overlapping print elements in both the horizontal and vertical direction in two passes per line, and for printing other characters in a single pass per line.

It is yet another object of the present invention to provide a matrix printer capable of printing both in the forward and reverse direction.

In accordance with an important aspect of the present invention, data defining each character of each font to be printed is stored in two components. The first of these components is the nominal position of the print head at which each of the print elements is to be fired to form a particular character. The second component is a time delay component which defines a time delay between the time that a nominal position is reached and the time that the imprinting element is fired. Thus, the print head position data provides a coarse definition of the shape of a character, and the time delay data provides accurate positioning of each printed element to define the fine features of the character.

BRIEF DESCRIPTION OF THE DRAWING

These and other objects and advantages of the present invention will become readily apparent upon consideration of the following detailed description and attached drawing, wherein:

FIG. 1 is a block diagram illustrating a typical printer system utilizing printers according to the present invention;

FIG. 2 is a diagram representative of the printing head and sheet stock medium advancing mechanism;

FIG. 3 is a front view of the printing head illustrating the positions of the printing elements forming the array;

FIG. 4 is a side view, partially in cross section, of one of the printing elements illustrated in FIG. 3;

FIG. 5 is a diagram illustrating all of the possible print positions that may be used to define a character;

FIGS. 6–10 are illustrations of various characters that may be printed by the printing system according to the invention;

FIGS. 14–17 are functional flow charts illustrating the logical operation of the control circuitry of the printer according to the invention.

DETAILED DESCRIPTION OF THE PREFERRED EMBODIMENT

Figure 11:
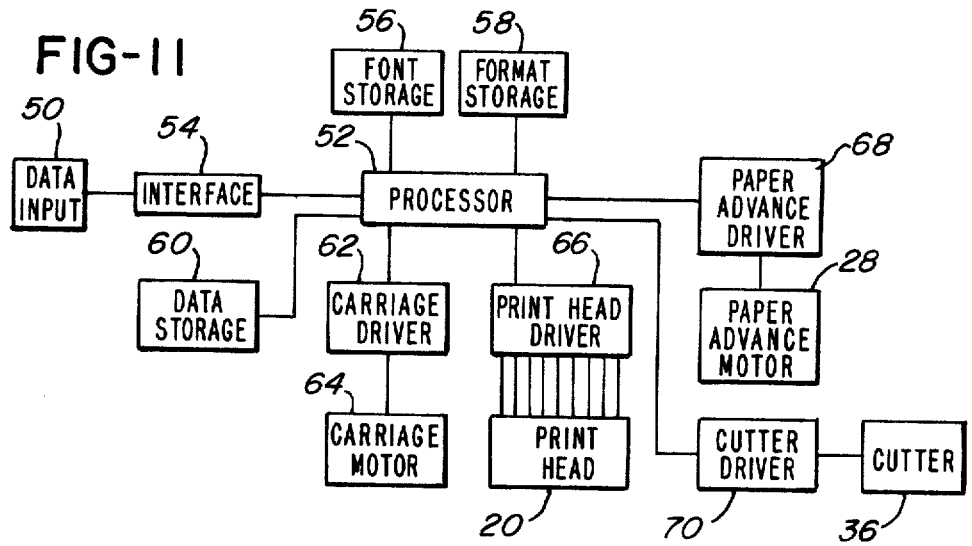
FIG. 11 is a functional block diagram of the control system employed in the printer according to the invention.

Referring now to the drawing, with particular attention to FIG. 1, there is shown a system utilizing several printers according to the invention, 10, 10a and 10b coupled to an input terminal 12, such as, for example, a cathode ray tube input terminal, a teletype, or other input terminal. The printers 10, 10a and 10b according to the invention are designed so that several printers may be accessed from a single input terminal 12 to permit more efficient inputting of data into the printers by permitting data to be input into one of the printers while the other printers are in the process of printing.

In order to permit several printers to be coupled to a single input terminal, one of the printers, such as, for example, the printer 10 is provided with a system control logic section 14 that communicates with the input terminal 12, the printers 10a and 10b as well as, for example, with a remotely located computer which can input data into any one of the printers 10, 10a or 10b via a line 15 and the system control logic 14. Each of the printers 10, 10a and 10b also contains a printer control logic section 16, 16a and 16b, respectively, which receives data from the system control logic 14 and converts the received data to control signals which operate the printing heads in the respective printers 10, 10a and 10b to generate characters in accordance with the data received from the input terminal 10 or from external sources such as via the line 15. Since, in the system according to the invention, only a single system control logic section 14 is required to control the operation of several printers, the printers 10a and 10b are not provided with such a system control logic section. Such an arrangement is advantageous since it results in a significant reduction in cost and complexity because additional printers added to the system need not have the system control logic section 14.

Each of the printers 10, 10a and 10b also includes a printing mechanism generally designated by the reference numeral 18 which comprises a printing head 20 that is supported above a sheet stock medium 22 by a pair of guides 24 and 26. In the embodiment illustrated, the sheet stock medium is a relatively heavy paper web suitable for being fabricated into merchandise tags; however, the system may be used to print onto various forms of sheet stock, including adhesive backed stock, check printing stock or ordinary paper. The sheet stock, or web, is contained in a roll 23 which is supported at a point 25 and advanced through the printer by a motor 28 which drives an advancing wheel 30. A roller 32 maintains the web 22 in contact with the advancing wheel 30 to permit the advancing wheel 30 to advance the web through the printer. In the embodiment shown, the motor 28 is a stepping motor; however, any suitable servo motor may be used. However, if a motor other than a stepping motor is used, some means must be provided to sense the position of the motor shaft in order to permit the motor shaft position to be accurately controlled. A web position sensor 34, which may be, for example, an optical sensor, is used to sense the position of the web and to indicate to the printer control logic that the web is in position for printing. A cutter 36, which is under the control of the printer control logic is used to cut the web after the web has been advanced a predetermined distance. If merchandise tag stock is being printed, the cutter 36 may be actuated each time the web is advanced a distance corresponding to the length of a single tag, or after the web has been advanced by a distance corresponding to the length of several tags, as desired.

In the embodiment illustrated in the drawing, the print head 20 is a matrix type magnetically actuated wire printer head that has two columns of printing elements; however, any type of matrix print head having one or more columns of printing elements may be used. In addition, although a magnetically actuated wire printing head is illustrated, the actual printing mechanism need not be mechanical or electromagnetic, and various printing mechanisms, such as thermal, ink spray or other printing mechanisms may be used.

In the embodiment illustrated in FIG. 3, the printing head 20 utilizes nine printing elements 40 disposed in two columns designated as A and B for purposes of identification. In the embodiment shown, each of the print elements 40 has a diameter of 0.014 inch, and the distance between the center lines of the print elements 40 in the columns A and B is 0.138 inch. The vertical spacing between centers of adjacent print elements in column A and column B is 0.01175 inch. Thus, since the vertical spacing between the elements 40 in column A and column B is less than the diameter of the print elements, a mark printed by an element in column A will overlap a mark printed by an adjacent element in column B.

During operation of the printer, the printing head 20 is moved in a direction perpendicular to the columns A and B, and the print elements 40 are selectively actuated as the print head 20 is moved in order to generate imprints at predetermined locations on the web. In the present embodiment, the imprint is made by electrically actuating a solenoid 42 (FIG. 4) in order to cause the print element 40 to extend from the head 20 and to contact an inked or carbon ribbon disposed between the web and the element 40, thereby causing the inked or carbon ribbon to produce a mark having a diameter substantially equal to the diameter of the element 40 on the web. However, as previously stated, thermal, ink jet or other printing techniques may be used. In the event of thermal printing, the web would be fabricated from thermally sensitive material and the temperature of the print elements 40 would be raised whenever a mark is desired. In the case of ink jet printing, the element 40 would be replaced with nozzles which would squirt ink whenever a mark was desired.

As was previously stated, the printer according to the present invention is capable of printing characters of various sizes in various fonts in either one pass or two passes of the printing head. However, in order to determine how the various characters are printed, it is necessary to understand the basic operation of the machine.

The printer according to the invention generates all of its characters from a matrix whose coarseness or fineness is determined by the number of columns contained in the printing head and the number of passes required to form a character. In the illustrated embodiment, a two-column printing head is employed, and characters are formed in either one or two passes; however, the device can be modified to utilize a head having more or less than two columns of elements and any number of printing passes.

The matrix of possible print positions utilizing a two-column printing head and one or two printing passes is illustrated in FIG. 5. In the matrix illustrated in FIG. 5, a vertical column is printed by first appropriately positioning one of the A or B columns over the area to be printed, energizing appropriate ones of the print elements in the column so positioned, stepping the head by an amount equal to the spacing between the A and B columns and energizing the other column to generate imprints between the imprints previously made in order to generate a vertical line from a series of overlapping dots. If further resolution is required, the sheet stock medium or web being printed is advanced by an amount equal to one-half the center-to-center vertical spacing between elements in the A and B columns of the print head, and a second pass, usually in the reverse direction, may be made to further fill in the vertical lines.

The matrix of possible print positions for a two-pass, two-column system is illustrated in FIG. 5. In the illustration of FIG. 5, the print positions of the elements of column A during the first pass are designated as A0 through A3, with the symbol A0 representing the bottom most element of column A and the designation A3 representing the upper most element of column A. Similarly, the print positions of the elements of column B are designated as B0 through B4. The horizontal print positions of the printing matrix are designated by the reference numerals 0 through 13. The designations A0' through A3' and the designations B0' through B4' indicate the print positions of the elements of the respective columns A and B during a second pass where the web of sheet stock has been advanced by a distance equal to one-half of the vertical center-to-center spacing of adjacent elements of column A and column B. The possible print positions of the elements during the second pass are at the same locations 0 through 13 that they were during the first pass. However, during any single pass, any given element cannot be fired successively along two adjacent horizontal possible print positions, but as a result of the mass of a print element, it can only be fired every other possible print position. Thus, if fine resolution in the horizontal direction is necessary, the gap between horizontal imprints left during a first pass can be filled in during the second pass.

The matrix of FIG. 5 illustrates the maximum size of a standard character. Such a standard character normally fills up the vertical possible print positions between B0 and B4 and the horizontal possible print positions between 0 and 8. The horizontal possible print positions 9 through 13 are normally left for intercharacter spacing; however, characters smaller or larger than a standard character may occupy a greater or smaller number of horizontal possible print positions, and thus, vary the intercharacter spacing accordingly.

As previously stated, the printer according to the invention is capable of printing both single-pass and double-pass characters. A typical single-pass character is the numeral "6" (FIG. 6) which happens to be a reduced size character that does not occupy the entire matrix of possible print positions. In the character illustrated in FIG. 6, each of the elements forming the character is positioned along the vertical possible print positions A0 through A2 and B0 through B3, and no vertical possible print position corresponding to primed, or second pass positions, are required. In addition, it is not necessary to actuate any print elements during adjacent horizontal possible print positions. The most rapid actuation occurs at vertical positions B0 and A1 where the elements are actuated at every other horizontal print position, namely horizontal positions 2, 4 and 6. Thus, the numeral "6" of FIG. 6 can be generated in a single pass. It is also to be noted that although a reduced size numeral "6" has been illustrated, a single-pass numeral "6" having a standard character size that occupies the entire matrix of possible print positions may also be generated. A reduced size numeral "6" is illustrated in FIG. 6 to indicate that various size characters can readily be printed on the same line in a single pass.

Often, it is necessary to generate characters with a greater resolution than can be generated with a single pass, such as in the case of optical character recognition, or OCR, characters. Such characters can readily be generated utilizing a two-pass technique wherein gaps or spaces left during the first pass can be filled in during the second pass. An example of a typical character that can be generated in two passes is the OCR character "6" illustrated in FIG. 7. In the example illustrated in FIG. 7, the web of sheet shock is advanced one-half step to the primed position after the completion of the first printing pass in order to permit the print positions A0' through B0' through B3' to be printed at the horizontal position 0, and to permit the positions B0' through B1' and A0' to be printed at the horizontal position 8. This fill-in during the second pass improves the definition of the four corners forming the bottom loop of the six. It should be noted that although the OCR numeral "6" illustrated in FIG. 7 is a standard size character, two-pass printing can also be utilized to improve the definition of characters smaller than the standard size.

Although two-pass printing greatly enhances the definition of many characters, characters having diagonal lines provide a particular problem for systems like the present system having discrete possible printing positions arranged in a matrix of horizontal rows and vertical columns. This is because diagonal lines produce a pronounced "staircase effect" when the angle of the diagonal line being printed is not the same as the angle between adjacent, diagonally offset, print positions. Such a staircase effect is illustrated in the diagonal line of the numeric "N" illustrated in FIG. 8. This "staircase effect" can be minimized by increasing the number of possible horizontal and vertical print positions, however, this is not practical since it greatly increases the complexity of the printer and reduces printing speed because either more passes are required, or the speed of the head must be reduced to permit a particular printing element to be fired more often within a given distance along the path of travel.

Therefore, in accordance with an important aspect of the present invention, the position of each element forming a print character is defined not only by the horizontal and vertical possible print positions it is to occupy, but also by a time delay term. Thus, in the system according to the present invention, a particular print element need not be fired immediately when a given print position is reached, but rather, the firing may be delayed by a predetermined time interval selected to permit the head to move a predetermined distance prior to actuating the printing element. Thus, each element forming the character need not be positioned exactly at a possible element location, but may be offset by a distance determined by the rate at which the printing head travels across the web of sheet stock medium and the time delay defining the position of the element. The improvement in definition of the character is readily apparent with reference to FIG. 9, which shows a substantially straight diagonal line in the numeric "N" rather than the "stairstep" diagonal illustrated in FIG. 8.

The printer according to the present invention can also be utilized to print characters that are larger than the size of a standard character. This is done by utilizing two passes to print the large size characters. During the first pass, the lower (or upper) half of the large size character is printed. The web of sheet stock is then advanced by an amount equal to or less than the height of the enlarged character, and the other half of the enlarged character is printed during the second pass.

For example, the numeral "2" illustrated in FIG. 10 was printed by first printing the lower portion defined by the printing positions B0 through B4 and A0 through A3, and then by advancing the web of sheet stock by twelve half steps (that is twelve times the distance it would have been advanced if a standard character were being printed in two passes as previously described) and printing the upper half of the numeral "2" in the print positions A1' through A3' and B2' through B4'. The printing elements corresponding to print positions A0' and B0' through B1' were not used during this pass, but they could have been used to fill in gaps between print positions B3 and B4, or alternatively, the web of sheet stock medium could have been advanced up to sixteen half steps to provide a character twice as large as a standard character, rather than the one and three-quarter size character illustrated in FIG. 10. It should be noted that, even in the case of large characters, such as the one illustrated in FIG. 10, the position of each printed element is defined not only by a possible print position, but also by a time delay. This is illustrated by the relatively straight diagonal line in the numeral "2" of FIG. 10, and also from the fact that many of the various printed elements do not lie on a possible print position, but rather are displaced therefrom by a distance corresponding to the programmed delay.

Data is input into the printer according to the invention by a data input terminal 50 (FIG. 11) which, as previously stated, may be a cathode ray tube data input terminal, such as the terminal 12 of FIG. 1, another computer, or simply a keyboard. The output signal of the data input 50 may be in the form of ASCII characters, which are applied to a processor 52 within the printer via an interface 54. The function of the processor 52 is to receive the ASCII data from the data input terminal 50 and to convert it to a form suitable for driving the print head, the carriage and the paper advance drivers in order to generate the appropriate characters on appropriate positions on the web being printed. Thus, although the processor 52 combines the functions of the system control logic 14 and printer control logic 16 of FIG. 1, it is illustrated as a single block for purposes of simplicity.

The system according to the present invention stores three types of information. The information that is stored includes information defining the various fonts, which is stored in a font storage location 56; data defining the format in which a particular tag or label is to be printed, which is stored in the format storage location 58; and data defining which alpha-numeric characters are to be printed, which is stored in a format storage location 60. In a typical system, the data stored in the font storage is preprogrammed and generally cannot be changed by data input from the data input 50. The data input from the data input 50 merely selects which character is to be printed. The format storage locations 58 are programmable by data input from the data input 50 and used to define the field in which the characters are to be printed. The data entered in the format storage defines the skeleton or the outline of the tag to be printed and includes such information as the font of each character, check digits which may be printed, whether or not the line of characters have a fixed length, whether certain characters are always printed, the location on the merchandise tag where the characters are to be printed, the length and width of each tag, the number of tags to be printed, and the number of tags to be printed between cuts.

The data stored in the data storage 60 stores data representative of the particular characters to be printed on a tag. This data is used in conjunction with the format storage data and the font storage data, and printing is controlled by selecting a particular format from the format storage data 58. The processor 52 then inserts the data from the data storage 60 in the appropriate places defined by the format storage 58 and prints the data in the appropriate font selected by the format storage 58 from the font storage 56. The processor 52 then converts the data stored in the data storage 60, the format storage 58 and the font storage 56 to signals that actually control the printing. These signals take the form of carriage control signals which are amplified by a carriage driver 62 which in turn actuate a carriage motor 64 which determines the position of the print head. Other signals which determine which pins of the print head to be fired or actuated are amplified by a print head driver 66 and used selectively to actuate the various pins of the print head 20. Similarly, a paper advance driver 68 amplifies signals from the processor 52 and controls the position of the paper advance motor 28. A cutter driver 70 amplifier signals from the processor 52 and causes the cutter 36 to be activated at predetermined intervals.

Figure 12:
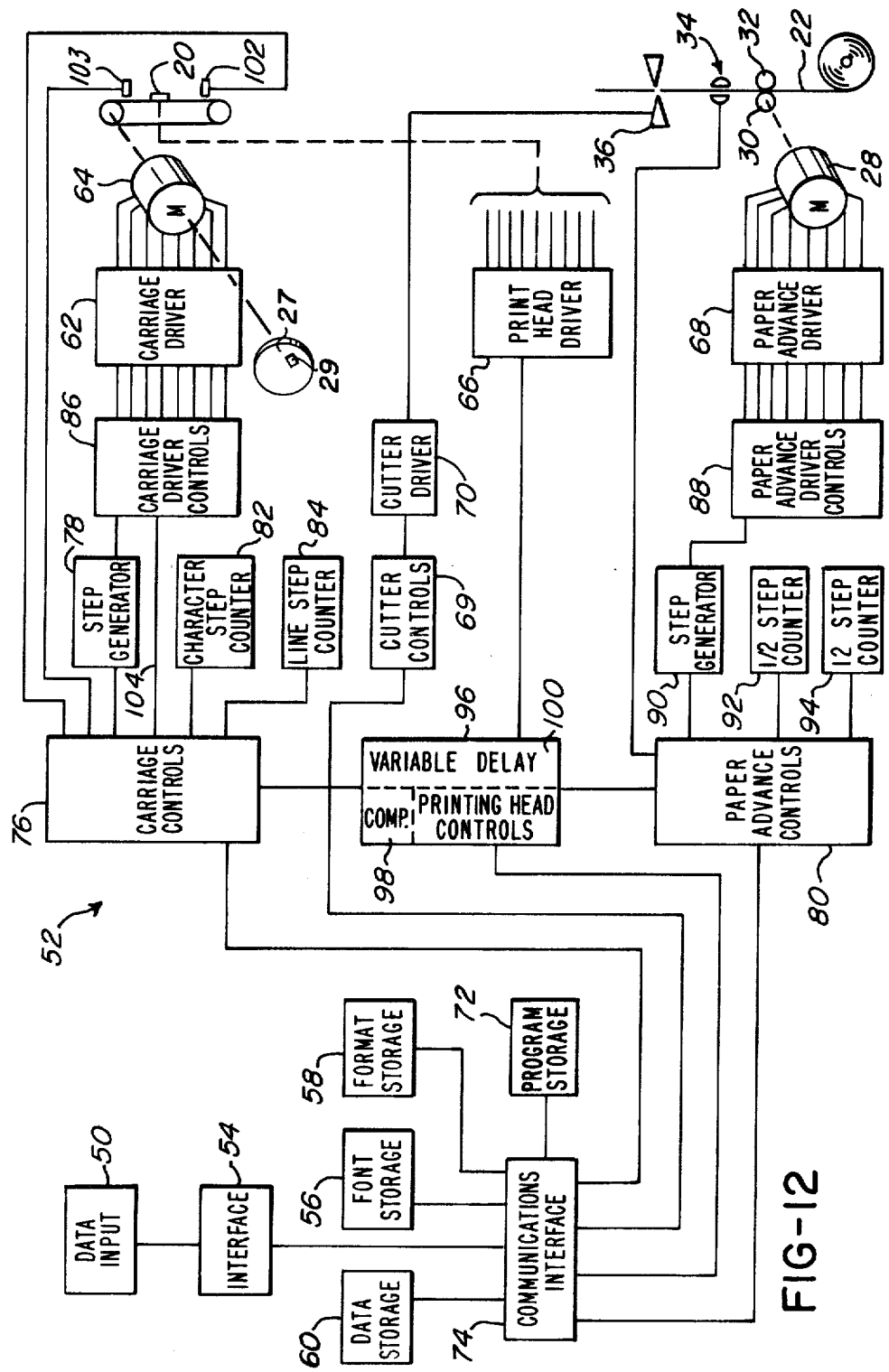
FIG. 12 is a functional block diagram similar to FIG. 11 illustrating the functional elements of the control system of the printer according to the present invention in greater detail.

FIG. 12 shows the system illustrated in FIG. 11, particularly the processor 52, in greater detail. In the block diagram illustrated in FIG. 12, the processor 52 includes program storage locations which control the flow of information between the data storage 60, the font storage 56 and the format storage 58 via a communications' interface 74. The processor 52 also includes cutter controls 69 which actuate the cutter driver 70, carriage controls 76 which cooperate with a step generator 78, carriage driver controls 80, a step character counter 82 and a line step counter 84 to actuate the carriage driver 62 to thereby control the motor 64. Similarly, paper advance controls 86 cooperate with paper advance driver controls 88, a step generator 90, a half-step counter 92 and a twelve-step counter 94 to control paper advance driver 68. A set of printing head controls 96 selectively operate various ones of the print head drivers 66 to activate the various pins in the print head 20 at appropriate times.

In the system according to the present invention, both the carriage motor 64 and the paper advance motor 28 are stepping motors having a plurality of sequentially operable field coils which cause the shaft of the motor to be incremented a predetermined increment each time different windings are successively energized. A motor other than a stepping motor may be used as the motor 64; however, if a motor other than a stepping motor is used, some means must be provided to sense the position of the motor shaft in order to permit the motor shaft position to be accurately controlled. A position indicating wheel 27, such as a magnetic wheel or a light chopping wheel, and a sensor 29, such as a light sensor or a magnetic shaft position sensor would be suitable for this purpose. The speed of the motors 64 and 28 is determined by the respective step generators 78 and 90 which in turn control the carriage driver controls and the paper advance driver controls 80 and 88 to cause different ones of the windings of the motors 64 and 28 to be energized each time a new step is generated by one of the step generators 78 or 90. The various counters, including the character step counter 82, the line step counter 84, the half-step counter 92 and the twelve-step counter 94 serve to provide indications of the positions of the carriage and also the position of the stock being printed. The character step counter 82 serves to indicate where the carriage is positioned with respect to a particular character being printed, while the line step counter serves to indicate the position of the head along a particular line being printed. Similarly, the half-step counter 92 is used to indicate when the stock has been advanced a half step so that the second printing pass, which fills in gaps left by the first printing pass, may begin. The twelve-step counter is used to determine when the stock has been advanced sufficiently to permit the second pass in the printing of an oversized character to be initiated.

In operation, data is input into the system from the data input 50. This data may be either format data, defining the field on which characters are to be placed, or may be data representative of the characters themselves. If the data being input is format representative data, that data is routed to the format storage 58 by the communications' interface 74, which is simply a series of electronic switches that route the data to appropriate locations. Similarly, data defining the characters that are to be printed is routed to the data storage 60.

The format storage 58 is capable of holding several formats, with the actual number of formats being determined by their complexity. This permits the operator first to store several formats, and then to select a particular one of the formats stored and to enter data to be printed in accordance with that format. Thus, if is not necessary to enter new format data each time new character data is to be entered. The operator simply selects one of the stored formats stored in the format storage 58, enters the character data and initiates the printing cycle. In the present embodiment, the operator may transmit data to any one or more of up to seven printers.

Once the print cycle has been initiated, the paper advance controls 86 cause the step generator 90 to generate steps to thereby cause the paper advance driver controls 88 and the paper advance driver 68 to cause the motor 28 to advance the web of sheet stock to the printing position. The web position sensor 34 senses the position of the web and applies the web position information, which may be information indicative of the position of the end of the web, or of the detection of a hole, slit or other index on the web, and applies this information to the paper advance controls 86. The paper advance controls utilize this information as well as information from the format storage 58 to advance the web 22 to a line position on which the first character is to be printed. Once this position is reached, the paper advance controls cause the step generator 90 to cease generating steps, thereby maintaining the motor 28 stationary.

As the web is being advanced, the carriage controls 76 cause the step generators 78 to generate steps that cause the carriage driver controls 80 and the carriage driver 62 to drive the motor 64 to a position corresponding to a beginning of a line position of the print head 20. When the web is positioned to a position corresponding to the first line to be printed, the carriage controls cause the step generator 78 to generate steps at a gradually increasing rate to accelerate the head to printing speed. At the same time, the line step counter 84 counts the number of steps generated by the step generator 78 (or a talbometer including a wheel 27, FIG. 12) to provide an indication of the position of the printing head 20 along the print line. When the count in the line step counter 84 corresponds with the position of the first character to be printed (as stored in the data storage 60 or format storage 58), the printing head controls 96 cause the print head driver 66 to activate the printing elements on the print head 20 in the particular sequence necessary to generate the character to be printed. The sequence information is determined by which character is to be printed, as determined by data stored in the data storage 60, and by the particular font of the character to be printed, as stored in the font storage 56. Thus, the data storage 60 selects a particular character to be printed, and the format storage 58 determines which font is to be printed, and the information defining the sequence of actuation of the printing element of the printing head 20 is retrieved from the font storage 56 in accordance with the character defined in the data storage 60 and the font defined by the format storage 58.

As previously described, and in accordance with an important aspect of the invention, the data defining each character of each font is stored in the font storage 56 as a combination of carriage position data, which indicates the approximate carriage position at which particular printing elements of the print head 20 are to be actuated, and time delay data which indicates a time delay interval between the time that the defined carriage position is reached and the actual time that the various print elements are fired. The carriage position data stored in the font storage 56 is representative of intracharacter position, or the position of the printing head 20 with respect to the particular character being printed. The character step counter 82 is reset at each new character position, and counts from zero through a count corresponding to the distance between the beginning of adjacent character spaces, for example, in the present embodiment, a count from zero through thirteen. The count in the character step counter 82 determines the position of the print head 20 with respect to the character being printed and is compared with the printing head position data stored in the font storage to control the firing of the elements 40 in the head 20. For example, if the count in the character step counter 82 is zero and the count in the line step counter 84 corresponds to data in the data storage 60 indicating that the letter "N" is to be printed at that position, and if the font selected corresponded to the font of the letter "N" illustrated in FIG. 9, the printing head controls would cause the printing elements corresponding to elements A0, A1, A2 and A3 to be energized in order to place imprints on the medium at the zero position in FIG. 9. The printing elements B0, B1, B2 and B3 are actuated when the count in the character step counter 82 indicated that the printing head 20 has moved a sufficient distance so that the B column of elements in the head 20 are positioned over the imprints previously printed by the A column of the print head 20. In the present embodiment, the spacing between the A and B columns on the print head 20 corresponds essentially to two steps of the character step counter 82. Thus, the appropriate elements in the A column are actuated when a count of zero is present in the character step counter 82, and the appropriate printing elements in the B column are actuated when the count in the character step counter reaches two.

Since the line located at the zero position of the character "N" of FIG. 9 is substantially vertical, there is no need to program any time delays into the data stored in the font storage 56 defining the vertical portion of the letter "N" at the print position zero. However, the diagonal line extending between print positions one and seven does not lie along a diagonal intersecting the various print positions between one and seven, and thus, a time delay factor must be stored. Those imprints along the diagonal requiring a time delay factor are illustrated in dashed lines, and it can be seen that the centers of the imprints indicated by dashed lines do not lie along any of the defined possible print positions. The distance between the actual center of the various imprints and the defined print positions corresponds to the distance travelled by the print head 20 during the delay time interval stored in the font storage 56. Thus, the offset of each imprint from a defined print position is determined by the stored delay for each offset imprint stored in the font storage 56.

As the print head 20 is transported across the web 22, a comparator 98 within the printing head controls compares the count in the character step counter 82 with carriage position data stored in the font storage 56. Whenever the count in the character step counter 82 corresponds to data in the font storage 56 indicating that one or more particular print elements are to be fired, the comparator 98 indicates to the printing head controls 96 which printing elements are to be actuated. The time delay data stored in the font storage 56 for each of the print elements to be actuated is then examined. If there is no delay stored within the font storage 56 for the actuation of a particular printing element, then that printing element is fired immediately, or within a minimum response time of the system, after the count in the character step counter corresponds to the data stored in the font storage 56. If there is delay time data associated with the location data for the actuation of a particular print element stored in the font storage 56, that time delay data is utilized to program the delay of a variable delay 100 within the printing control head 96. In this case, the output of a comparator 98 triggers the variable delay 100 whenever the print head position data stored in the font storage 56 corresponds to a count in the character step counter 82, and the variable delay 100 actuates the appropriate element in the print head 20 via the print head driver 66 after a time interval corresponding to the delay data stored in the font storage 56 has elapsed.

In the present embodiment, the sequence of the comparator 98 triggering the variable delay 100, which in turn triggers the print head 20 via the print head driver 66, is utilized even when no delay term is stored for a particular actuation of a particular printing element stored within the font storage 56. When no delay data is stored, the delay provided by the variable delay 100 is set to zero, or as near to zero as is practicable. However, in practice, the delay provided by the variable delay 100 cannot be practically reduced to zero, and it is this delay that was referred to as the system delay above in connection with the discussion of the actuation of printing elements when no delay term is stored in the font storage 56.

After the first pass in the printing of the character "N", such as the character "N" illustrated in FIG. 9, or any other character being printed, has been completed, the head continues along the print line being printed, until the end is reached. The end of the print is indicated by an end-of-line indicator 102 which indicates to the carriage control 76 that the end of the line has been reached. A similar beginning of line indicator 103 is used to indicate the beginning of a line. When this occurs, the rate at which the step generator 78 generates steps is gradually reduced in order to bring the print head 20 to a stop. Subsequently, a signal is applied from the carriage control 76 to the carriage driver controls 80 via a line 104 indicating that the direction of the motor 64 is to be reversed. This causes the carriage driver controls 80 to reverse the sequence of the energization of the field windings within the motor 64 to cause the motor 64 to rotate in the opposite direction. The step generator 78 is then caused to again generate steps at a gradually increasing rate to cause the printing head 20 to be accelerated in the reverse direction. Also, when the end of the print line is reached, the web 22 is advanced by an appropriate amount to permit the second pass to be printed. In the event of a two-pass, standard size character, such as the character "N" illustrated in FIG. 9, the web 22 is advanced by an amount equal to essentially one-half the vertical distance between the centers of the printing elements in a given column. This distance is determined by the halfstep counter 92, and causes the web 22 to be advanced by an amount sufficient to cause imprints made on the web during the second pass to overlap the imprints made by elements of the same column on the first pass.

As the reverse printing pass begins, the line step counter 84 is decremented and the count therein is compared with the data stored in the data storage 60 and the format stored in the format storage 58 to determine when and where a particular character is to be printed. Whenever a particular character to be printed is identified, the count in the character step counter 82 is increased to its maximum count of thirteen, and the count gradually decremented to zero as the reverse printing of that character takes place. As in the case of the forward printing pass, the location of each imprint is controlled by storing position location data and delay time data in the font storage 56; however, the time delay data stored in the font storage 56 for printing in the reverse pass defining a particular print location is different from the data defining the same print position in the forward pass since printing is now occurring in the reverse direction, and the B column precedes the A column, rather than vice versa as in the forward pass. However, the delay data need only be modified by a constant relating to the distance between the A and B columns, and by the time required by the print elements to actually make an imprint after being actuated (flight time).

In the letter "N" illustrated in FIG. 9, the reverse printing direction print positions are indicated by the positions B0' through B3' and A0' through A3'. As can be seen from the location of the imprints occurring during the reverse pass, particularly at locations along the diagonal of the "N" as well as the upper lefthand corner and lower righthand corner of the "N", the imprints made during the second pass substantially overlap the imprints made during the first pass to form a substantially straight, solid line. The printer continues to print in both directions until all of the entered data is printed in accordance with the appropriate format. After this occurs, and assuming that more than one tag is to be printed, the web 22 is again advanced to the next printing position, and if it is desired to produce individual tags, the cutter 36 (FIG. 12) is actuated by the cutter controls 69 and the cutter driver 70 to separate the just-printed tag from the rest of the web 22. If individual tags are not desired, the web is simply advanced to the next printing position and the data is again printed. After the second tag or group of tags have been printed, the web 22 is again advanced, and the cutter 36 may be actuated, if desired. Thus, the printer according to the present invention may be utilized to print individual tags, a complete roll of attached tags, or groups of tags having any number of attached tags.

In the event that an oversize character is being printed, the web advance is controlled by the twelve-step counter 94, which causes the web 22 to be advanced, for example twelve steps, to permit an oversize character, such as the character "2" of FIG. 10, to be printed. In the event of the printing of such oversize characters, it should be noted that the imprints made on the second pass, A1' through A3' and B2' through B4', are printed above the imprints B0 through B4 and A0 through A3 made on the first pass, rather than overlapping them. However, as in the case of printing standard size characters, the location of each imprint is defined by a print position term as well as a delay term. This is evident from the fact that not all of the imprints, particularly along the diagonal of the FIG. "2", lie directly on a defined print position, but are offset therefrom by a term related to the time delay.

Figure 13:
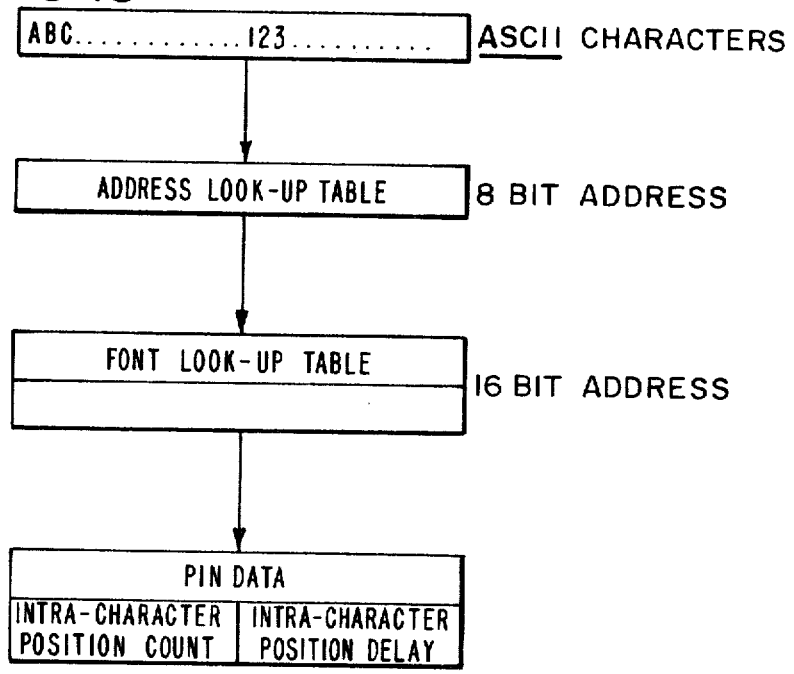
FIG. 13 is a diagram illustrating the format in which the data defining each character is entered and stored.

As previously stated, the data entered by the data input 50 (FIG. 12) or the input terminal 12 (FIG. 1) is not directly compatible with the printer logic, but has typically a standard data format, such as ASCII. Thus, the data entered into the printer must first be converted to a format usable by the printer before printing can occur. This is accomplished by a series of look-up tables as illustrated in FIG. 13. For example, the ASCII data representing each character is received and applied to an address look-up table that generates different eight-bit address for each of the ASCII characters received. Thus, if not all characters that can be defined by the ASCII system are to be printed by the printer, only those capable of being printed by the printer need be stored in the address look-up table, thus saving storage space.

After the address of a particular character has been determined from the eight-bit address look-up table, the particular font in which that character is to be printed is determined from the data stored in the format storage 58 (FIG. 12) and applied to a font look-up table (FIG. 13) within the font storage 56 (FIG. 12). The font look-up table then generates a 16-bit address indicating where the data defining the particular character to be printed in the selected font may be found in the font storage 56. The 16-bit address from the font look-up table then addresses the data in the font storage 56 which defines the particular character to be printed. In the particular embodiment shown, the data defining the character is provided in two bytes in the format illustrated in FIG. 13. This format begins with a link bit, typically a one which indicates that additional frames of data follow. This link bit is followed by some unused data positions, which are in turn followed by pin data which gives the frame pin pattern or which of the pins are to be fired in order to form the character. In the subsequent byte, data representative of the intracharacter position count is provided.

Following the intracharacter position count, data representative of the intracharacter position delay is provided. Thus, the printer is able to monitor the count provided by the character step counter 82 (FIG. 12) with the data provided in FIG. 13 by comparing the count in the character step counter 18 with the stored intracharacter position count. Whenever the count provided by the character step counter 82 corresponds to an intracharacter position count, the pin data is examined to determine which pins or printing elements are to be actuated at that nominal intracharacter position, and the intracharacter position delay data is examined to determine the actuation time delay for each pin. In the present embodiment, the distance between adjacent possible print positions is divided by sixteen, and the intracharacter position delay is stored as a number representative of the number of sixteenths of the distance between adjacent print positions that the center of the imprint is to be offset from the last possible print position.

The steps by which the printer processes received data are illustrated in FIGS. 14-17. In FIG. 14, the line pointer is initialized to starting position and the printer status is set to ready to enable the printer to receive a new transmission. The data received is repeatedly checked to determine whether the data being received is indeed a new transmission, or the continuation of another transmission, possibly meant for another printer, or noise. This determination is made by checking for a start of transmission code.

If a start of transmission code, indicating a new transmission, is detected, then a determination is made to determine whether a single-pass font or a double-pass font has been selected. If a single-pass font has been selected, a flag indicating a "fast font" is set. If a single-pass font has not been selected, the data is examined to determine whether the font is an oversized or "bold" font. If a bold font has been transmitted, then a bold font flag is set. If not, no flag is set. If no flag is set, this is interpreted as meaning that a double-pass, standard size font has been selected.

If the fast font flag has been set, a determination is made if the bold flag had been set by previously-received data. The purpose of making this determination is that if single-pass font data is presently being received and if the bold font flag had been previously set, even though single-pass font data is being received, the previous setting of the bold flag indicates that the line to be printed contains bold font in addition to the single-pass font, and thus two printing passes must be made even though the data currently being received is single-font data. Similarly, if bold pass font is currently being received, the double-pass flag must be set even though the previous data was single-pass data. Thus, if a bold font is contained in any one line being printed, the bold flag is set to indicate to the printer that the web must be advanced a sufficient amount between passes to permit the oversize font to be printed. The double-pass flag simply indicates that two passes will be necessary to print that particular line.

If only single-pass font data has been received, neither the bold flag nor the double-pass flag is set, and the data is simply stored, provided that the data is not control data as indicated by the control character SI. If the data being received is neither single-pass nor bold, it is examined for a carriage return character, CR. If such a character is present, all previous bold and fast font flags are set and the double-pass line pointer is incremented to indicate that a standard size, double-pass character is being printed. The data is then stored, provided no SI character, indicative of control data, is present. If no carriage return, CR, has been detected, the data is nevertheless examined for the presence of the SI character, and if such a character is present, the batch control pointer is set to the starting position. The stored line data and the batch control pointer data are then examined for the presence of an end of text, ETX, character, normally present at the end of the control data which follows the character data. If no end of text character is received, the printer is set to receive another transmission. If an end of text character has been received, the printer is conditioned to process the data for printing.

Figure 16:
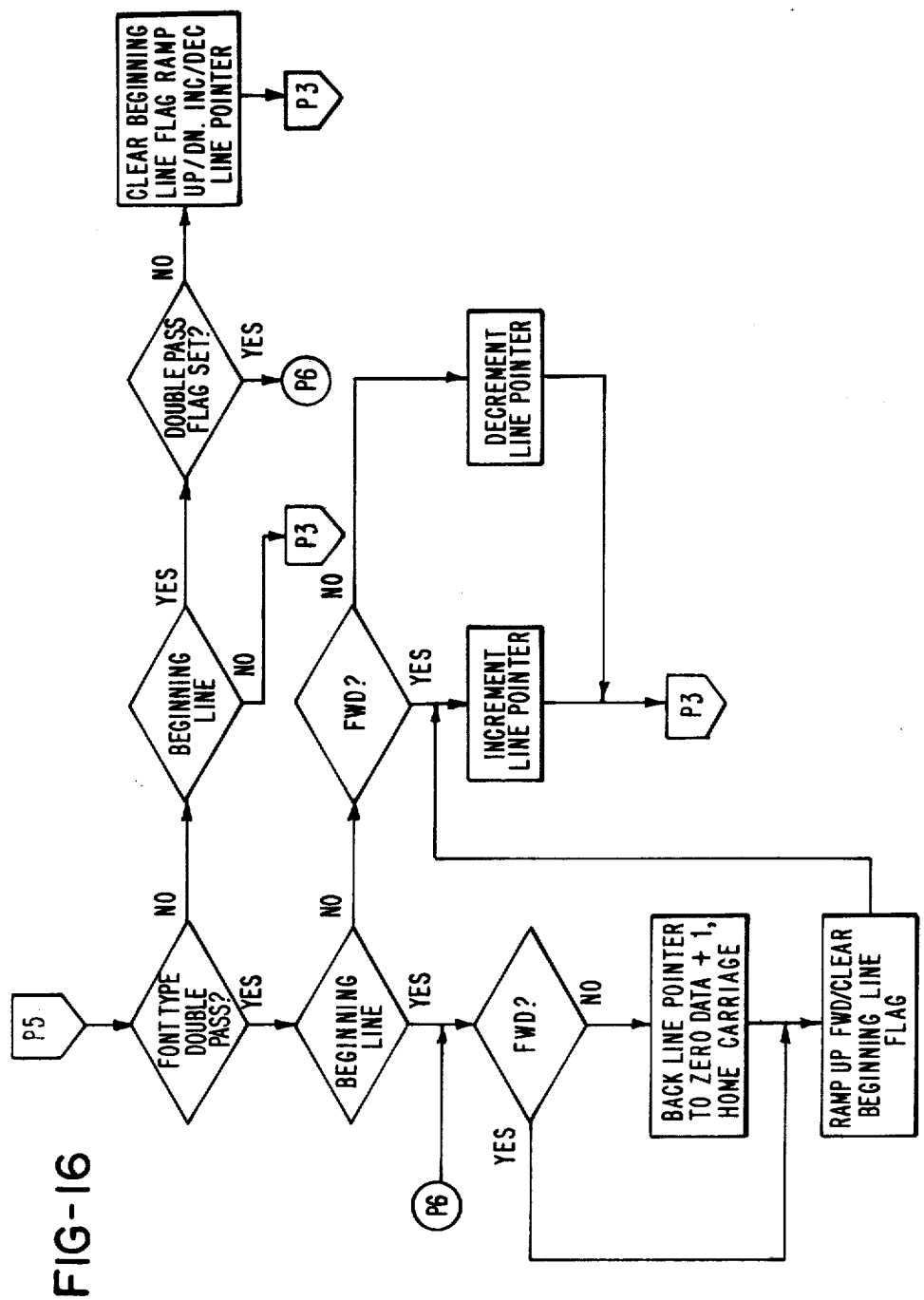

If the printer has been conditioned for printing, the pointer indicating the present line is temporarily stored (FIG. 15) and a beginning line flag is set. The value of the present line pointer is set only in temporary storage because at this point it is not known whether the data represents data in the forward printing direction or in the reverse printing direction. The pointer is then backed to the beginning of the line, which is done by looking for the carriage return of the previous line and incrementing the pointer one space after the previous carriage return. The data is then converted from ASCII, or from whatever form the data was received, and loaded into a batch buffer and the pointer incremented. The line is then examined by determining the physical position of the head to determine whether it is a single- or double-pass line. If it is a double-pass line, the print head travel must begin in the forward direction. If it is a single-pass line, and the print head is set to travel in the reverse direction, the web is advanced to the next line position. Data is loaded temporarily as a new pointer and the pointer is decremented to indicate that the loading of the data should begin just ahead of the carriage return, CR, rather than just after it. The next character is then loaded and examined to determine whether it is a double-pass type of font, such as, for example, optical character recognition or oversize font, or whether it is a single-pass, high-speed font. If it is a standard size, double-pass font, such as OCR, the OCR offset, which controls the horizontal centering of the character is loaded and the font is set to double pass. If the character is an oversize or bold character, the bold offset is loaded and the font is again set to double pass. If the character is a standard-size, high-speed or single-pass character, the high-speed offset is loaded and the font is set to single pass. If the character is a double-pass font type, the proper beginning printing direction must be set up. The setting up of the proper beginning printing direction is illustrated in FIG. 16. The font of the present character is first examined to determine if it is a double-pass type font. If it is not, the data is examined to determine whether this character is the first character of the line of data to be printed. If not, the proper printing direction has already been set up in the beginning line and the next character may simply be loaded. If it is the beginning character, a check is made to determine whether the double-pass flag has previously been set. If no double-pass flag has been set, the beginning line flag is cleared. The print carriage is ramped up to speed and the line pointer is incremented or decremented, and the next character is loaded. If the double-pass flag had been set by previous data, a check is made to determine whether the print carriage is travelling in the forward or reverse direction. If it were forward direction, the print head is ramped up in the forward direction and the beginning line flags cleared. If the carriage were not going in the forward direction, the line pointer would be backed to zero data plus one and the carriage homed, prior to ramping up in the forward direction and clearing of the beginning line flag. The line pointer is then incremented prior to loading the new character.

If the font type of the present character is a double-pass font, the data is checked to determine whether it is beginning line data. If it is, and if the carriage is going in the forward direction, the carriage is simply ramped up. Otherwise, it is returned to the home position prior to being ramped up as previously described. If the data is not beginning line data, a determination is made to see whether the print direction is forward or reverse, and the line pointer is incremented or decremented accordingly, and the next character loaded.

Figure 17B:
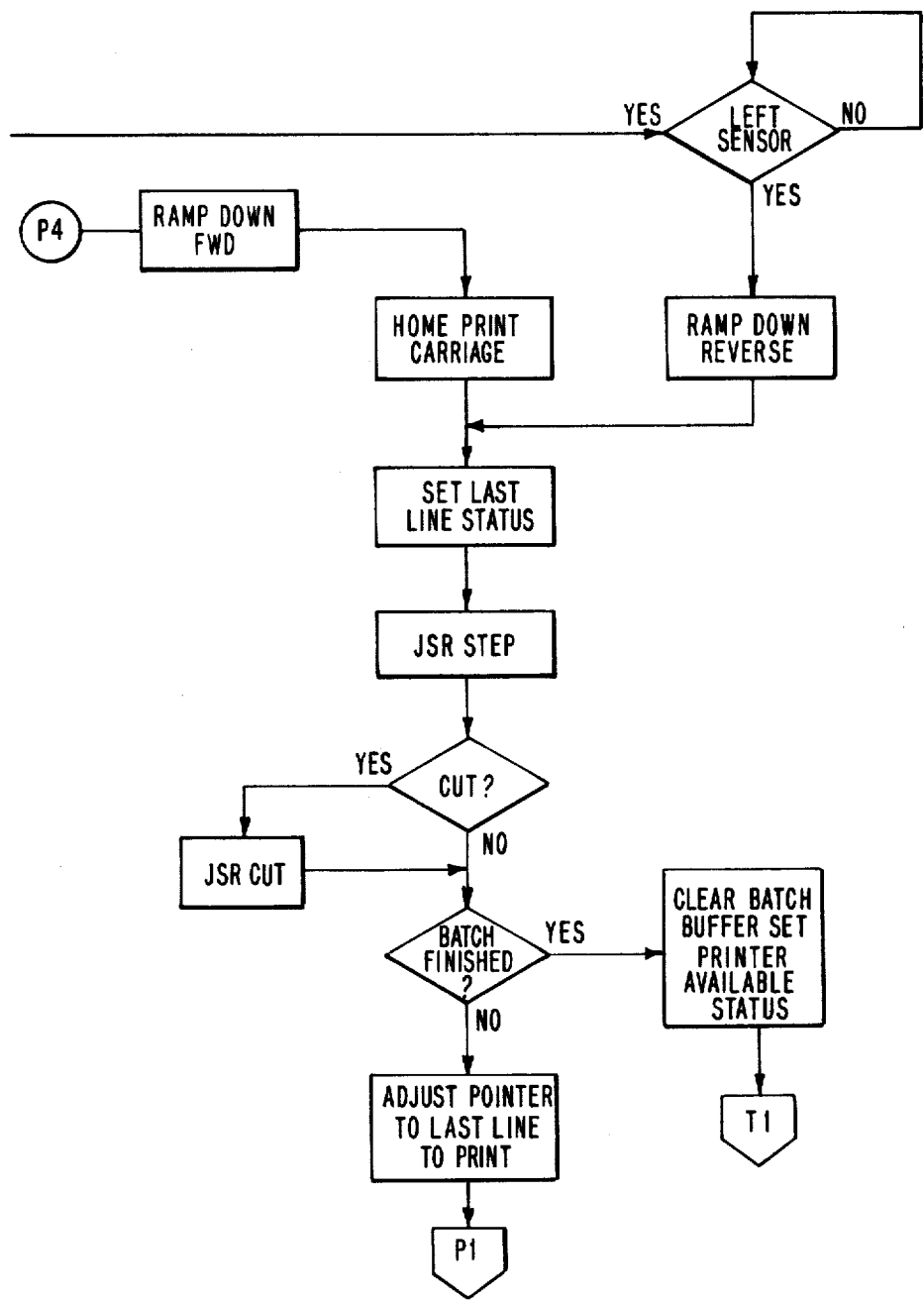

If the font is none of the three fonts previously discussed, a check is made to see if it is a reduced size or small font (FIG. 17). If it is, the appropriate small font is loaded and the single-pass font flag set, and the data is processed in a similar manner to the processing of the high-speed font. If it is not a small font, a count of the data is made to determine whether there is zero data representative of the end of line in the reverse direction. If it is a zero, the travel of the printing head is ramped. Determination is made whether or not additional lines or print are required. If not, the tag or label is cut as necessary and printing stopped if the batch is finished.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A matrix printer suitable for printing characters on a sheet stock medium, comprising:
means including a printing head having a plurality of printing units arranged in an array for making imprints at desired locations defining the character being printed;
means coupled to said printing head for transporting said printing head with respect to said sheet stock medium in a first direction with respect to the direction of said array;
means coupled to said transporting means for determining the position of said printing head along said first direction with respect to said sheet stock medium;
means coupled to said printing head and responsive to said position determining means for activating predetermined ones of said printing units to generate imprints on said sheet stock medium at predetermined delay times after said printing head reaches predetermined positions along said first direction with respect to said sheet stock medium, said predetermined delay times being different for the various printing units and variable as a function of the predetermined positions along said first direction relative to the desired locations of the imprints defining the character being printed.

2. A printer as recited in claim 1 further including font storage means coupled to said activating means for storing data representative of the predetermined positions and data representative of the predetermined delay time at which said printing units are to be activated in order to form a predetermined character.

3. A printer as recited in claim 1 wherein said printer includes means coupled to said sheet stock medium for advancing said sheet stock medium a predetermined distance in a second direction with respect to said array.

4. A printer as recited in claim 3 wherein said predetermined distance is less than the distance between adjacent printing units.

5. A printer as recited in claim 3 wherein said predetermined distance is greater than the distance between adjacent printing units but no greater than the dimension of the array along the direction of advancement of the sheet stock medium.

6. A printer as recited in claim 1 wherein said array is a linear array having a longitudinal dimension extending in a direction transverse to said first direction.

7. A printer as recited in claim 6 wherein said array includes first and second parallel columns of elements with the elements of one of said columns being offset in the longitudinal direction with respect to the elements in the other column so that the elements of the two columns are partially interleaved.

8. A printer as recited in claim 2 wherein said transporting means includes means for generating an impulse upon the movement by said printing head of a predetermined increment along said first direction, and said position determining means includes means for counting the number of impulses generated.

9. A printer as recited in claim 8 wherein said font storage means includes means for storing numbers representative of said predetermined positions, and wherein said activating means includes means for comparing the number of impulses counted by said counting means with said stored numbers.

10. A printer as recited in claim 9 wherein said counting means includes first counting means for providing a count representative of the position of the printing head with respect to the sheet stock medium along said first direction and said second counting means for providing a count representative of the position of the printing head with respect to a character being printed.

11. A printer as recited in claim 10 wherein said comparing means includes first means for comparing representations of the numbers stored in said font storage means with representations of the count provided by said second counting means.

12. A printer as recited in claim 11 further including means for storing data representative of the position on the sheet stock medium where a predetermined character is to be printed, and wherein said comparing means includes means for comparing the data stored in said data storing means with the count provided by said first counting means.

13. A printer as recited in claim 11 wherein said activating means includes delay means responsive to the data representative of the predetermined delay times stored in said font storage means and to said first counting means for activating a predetermined one of said printing units upon the elapse of said predetermined delay time subsequent to the occurrence of a predetermined comparison by said first comparison means.

14. A printer as recited in claim 3 wherein said sheet stock advancing means includes means for generating an advancing impulse upon the movement by said sheet stock medium of a predetermined increment along said second direction, said printer including advance counting means responsive to the number of advancing impulses generated in order to provide an advancing count representative of the position of said sheet stock along said second direction.

15. A printer as recited in claim 14 wherein said advance counting means includes a first advance counter cooperating with said advance impulse generating means for advancing said sheet stock medium said predetermined distance less than the distance between adjacent printing units.

16. A printer as recited in claim 15 wherein said advance counting means includes a second advance counter cooperating with said sheet stock advancing means for advancing said sheet stock said predetermined distance greater than the distance between adjacent printing units but no greater than the dimension of the array along the direction of advancement of said sheet stock.

17. A method of imprinting on a sheet stock medium characters formed from individual elemental sections disposed in various predetermined arrays to form various predetermined characters, comprising the steps of:
storing a spatial coordinate associated with each of the elemental sections forming each of the predetermined characters;
storing a delay time associated with each of said spatial coordinates;
moving an imprinting head having a plurality of individually actuatable imprinting elements with respect to the sheet stock medium;
determining the position of the imprinting head with respect to the sheet stock medium as the imprinting head is moved with respect thereto;
determining the relationship between the position of the imprinting head and the various stored spatial coordinates;
selecting for actuation various predetermined ones of said imprinting units when the imprinting head is positioned such that the actuation of a particular imprinting unit will produce an elemental section substantially at a location corresponding to one of the stored spatial coordinates; and
actuating each imprinting unit selected to be actuated after a time interval corresponding to the delay time associated with the spatial coordinate of the elemental section to be produced by the actuation of that particular imprinting unit.

18. The method recited in claim 17 wherein some of the elemental sections are imprinted during the step of moving the printing head in a first direction with respect to the sheet stock medium, and the remainder of the elemental sections are printed during the step of moving the imprinting head in a second direction with respect to the sheet stock medium.

19. The method recited in claim 18 further including the step of advancing the sheet stock medium a predetermined increment in a third direction between the steps of moving the imprinting head in the first direction and the step of moving the imprinting head in the second direction.

20. The method recited in claim 19 wherein said increment is smaller than the distance between said imprinting elements.

21. The method recited in claim 19 wherein said increment is greater than the distance between said imprinting elements.

22. Apparatus for imprinting on a sheet stock medium characters formed from individual elemental sections disposed in various predetermined arrays to form various predetermined characters comprising:
means for storing a spatial coordinate associated with each of the elemental sections forming each of the predetermined characters;
means for storing a delay time associated with each of said spatial coordinates;
an imprinting head having a plurality of individually actuable printing units;
means coupled to said imprinting head for moving said imprinting head with respect to the sheet stock medium;
means for indicating the position of the imprinting head with respect to the sheet stock medium as the imprinting head is moved with respect thereto;
means coupled to said indicating means and said spatial coordinate storing means for determining the relationship between the position of the imprinting head and the various stored spatial coordinates;
means responsive to said determining means for selecting for actuation various predetermined ones of said printing units when the imprinting head is positioned such that the activation of a selected printing unit will produce an elemental section substantially at a location corresponding to one of the stored spatial coordinates; and
delaying means within said actuating means coupled to said delay time storing means for delaying after selection the actuation of each printing unit to be actuated by a time interval corresponding to the delay time being associated with the spatial coordinate of the elemental section to be produced by the actuation of that particular printing unit.

23. Apparatus as recited in claim 22 wherein said imprinting head moving means includes means for moving said imprinting head in a first direction with respect to said sheet stock medium, and said apparatus further includes means for advancing said sheet stock in a second direction transverse to said first direction.

24. Apparatus as recited in claim 23 wherein said sheet stock advancing means includes means for advancing said sheet stock an increment less than the distance between imprinting units.

25. Apparatus as recited in claim 24 wherein said imprinting head moving means and said selectively actuating means cooperate to produce additional elemental sections at other locations corresponding to other stored spatial coordinates and delay times after said sheet stock has been advanced by said stock advancing means.

26. Apparatus as recited in claim 25 wherein said moving means includes means for moving said imprinting head in a third direction opposite to that of said first direction while said other elemental sections are being produced.

27. Apparatus as recited in claim 23 wherein said sheet stock advancing means includes means for advancing said sheet stock an increment greater than the distance between printing units.

28. Apparatus as recited in claim 27 wherein said imprinting head moving means and said selectively actuating means cooperate to produce different elemental sections at other locations corresponding to other stored spatial coordinates and delay times after said sheet stock has been advanced by said sheet stock advancing means.

29. Apparatus as recited in claim 28 wherein said moving means includes means for moving said imprinting head in a third direction opposite to that of said first direction while said other elemental sections are being produced.

30. Apparatus as recited in claim 23 wherein said imprinting units are arranged in an array of first and second parallel columns, each column having a longitudinal direction transverse to said first direction, with the printing units in one of said columns being offset in the longitudinal direction with respect to the printing units in the other column.

31. Apparatus as recited in claim 30 wherein the printing units of the two columns are partially interleaved.

32. Apparatus as recited in claim 22 wherein said imprinting head position indicating means includes means for providing a first indication of the position of the imprinting head with respect to a line of characters being printed and means for providing a second indication of the position of said imprinting head with respect to an individual character being imprinted.

33. Apparatus as recited in claim 32 wherein said printing head position indicating means includes means for producing a plurality of impulses concurrent with the movement of said imprinting head, first means responsive to said pulse producing means for counting said impulses to provide said first indication, and second means responsive to said impulse producing means for counting said impulses to provide said second indication.

34. Apparatus as recited in claim 33 wherein said imprinting head moving means includes a stepping motor and said impulse producing means includes a step generator operatively coupled to said stepping motor for controlling the operation thereof.

35. Apparatus as recited in claim 33 wherein said impulse producing means includes a tachometer.

36. Apparatus as recited in claim 33 wherein said determining means includes comparing means operatively coupled to said second counting means and to said spatial coordinate storing means for comparing the count present in said second counting means with predetermined ones of said spatial coordinates stored in said spatial coordinate storing means.

37. Apparatus as recited in claim 36 further including means for storing data representative of particular characters to be imprinted and the positions on the sheet stock at which the particular characters are to be imprinted.

38. Apparatus as recited in claim 37 wherein said determining means includes comparing means operatively coupled to said first counting means and to said data storage means for comparing the count present in said first counting means with data representative of the particular positions of the characters to be imprinted.

39. Apparatus as recited in claim 38 wherein said imprinting head moving means includes means for moving said imprinting head in a first direction with respect to said sheet stock medium, and said apparatus further includes means for advancing said sheet stock medium in a second direction transverse to said first direction.

40. Apparatus as recited in claim 39 wherein said apparatus includes second pulse producing means for producing a plurality of pulses upon the advancement of sheet stock medium.

41. Apparatus as recited in claim 40 further including advance pulse counting means for counting the pulses counted by said second pulse producing means and providing an indication of the degree of advancement of said sheet stock medium.

42. Apparatus as recited in claim 41 wherein said comparing means is further operatively coupled to said advance pulse counting means for comparing the count present in said advance pulse counting means with data representative of the particular position of the characters to be printed stored in the data storage means.

43. A matrix printer as recited in claim 1 wherein said predetermined positions are defined with respect to the position of the character being printed.

44. A matrix printer as recited in claim 43 wherein the character being printed is defined by a matrix of possible print positions and said predetermined positions are defined with respect to said matrix.

45. In a matrix printer of the type that includes an imprinting head having a plurality of individually actuable printing units for forming individual elemental sections disposed in various predetermined arrays to form various predetermined characters and means for transporting said printing head with respect to said sheet stock medium, the improvement comprising:
means for storing a spatial coordinate associated with each of the elemental sections forming each of the predetermined characters; and
means for storing delay times associated with said spatial coordinates, said spatial coordinate storing means and said delay time storing means cooperating to render said printing units operative to be actuated after the elapse of time intervals corresponding to the delay times associated with the spatial coordinates of the elemental sections to be produced by the actuation of the various printing units.

* * * * *